Patented Apr. 21, 1942

2,280,256

UNITED STATES PATENT OFFICE 2,280,256

POLYMERIZATION OF MALEIC ACID-LINSEED OIL FATTY ACIDS - ETHYLENE GLYCOL-ALLYL ALCOHOL RESIN

Donald G. Patterson, Stamford, Conn., assignor to American Cyanamid Company, New York, N. Y., a corporation of Maine No Drawing. Application December 13, 1939, Serial No. 308,953

1 Claim. (Cl. 260—22)

This invention relates to heat- and oxygen-convertible polyester resins.

An object of this invention is to provide a means of obtaining low acid number heat- and oxygen-convertible resins which contain many unsaturated groups.

Another object of the present invention is to provide polymerizable materials of relatively low viscosity having good stability upon storage. Still another object of this invention is to provide polyesters which upon polymerization are substantially infusible and substantially insoluble.

These and other objects are attained by esterifying a dicarboxylic acid, preferably an $\alpha, \beta$-unsaturated dicarboxylic acid with a mixture including a polyhydric alcohol and a straight chain unsaturated monohydric alcohol which has a terminal double bond.

The following examples in which the proportions are given as parts by weight are given by way of illustration and not in limitation.

Example 1

| | Parts |
|---|---|
| Maleic anhydride | 392 |
| Ethylene glycol | 130 |
| Allyl alcohol | 255 |
| Linseed oil fatty acids | 37 |
| Ethylene dichloride | 389 |
| p-Toluene sulfonic acid | 4 |

These substances are placed in a suitable reaction chamber to which a reflux condenser is attached. The reflux condenser preferably discharges the condensate into a trap where the water of esterification may be separated from the essentially non-aqueous fraction of the condensate and the latter is returned to the reaction chamber. The ethylene dichloride is included in order to separate the allyl alcohol from the water of esterification which is formed during the process. The reaction chamber and its contents are heated to about 90°–150° C. and maintained at this temperature for about forty-eight to sixty hours or until the acid number of the polyester is sufficiently low. During this time the reaction is preferably carried out under an inert atmosphere, e. g., carbon dioxide or nitrogen, etc. After sufficient reaction to obtain the desired acid number the reaction mixture is subjected to a vacuum distillation at about 140°–150° C. and at about 1–5 mm. of mercury absolute pressure. All of the ingredients which are volatile under these conditions are removed, leaving as a residue a nearly water-white polyester of relatively low viscosity and having an acid number of about 6–7.

Example 2

About 0.2% of a suitable catalyst, e. g. benzoyl peroxide, is added to the polyester obtained in Example 1. This composition is applied to paper in any desired manner, for example, by dipping. The paper is passed through squeeze rolls to adjust the amount of resin carried by the paper, and the paper so impregnated is baked in an oven at 50°–80° C. for about five minutes to sixty minutes. The paper may then be cut into sheets of any desired size, stacked to any required thickness and molded between hot platens at about 135° C. at a pressure of about 1000–2000 lbs./sq. in. The compressed laminated article thus formed is cured at about 135°–165° C. for about three to five hours or until maximum strength has been attained. This procedure results in a molded article having unusual resistance to fracture by impact.

Example 3

About 0.2% of benzoyl peroxide and about 0.04% of cobalt (added as naphthenate) is added to the polyester obtained in Example 1. Coatings of this composition are applied to tin and baked at about 90°–150° C. for about ten to thirty minutes. A clear, hard, flexible coating is obtained. Since such coatings are odorless and tasteless they have been found to be particularly suitable for use as beverage or food container coatings. In this application the polyester composition containing the catalyst may be applied to the containers or to the sheet metal from which the containers are to be fabricated.

Example 4

| | Parts |
|---|---|
| Maleic anhydride | 392 |
| Sebacic acid | 162 |
| Ethylene glycol | 156 |
| Allyl alcohol | 306 |
| Ethylene dichloride | 508 |
| Paratoluene sulfonic acid | 5 |

These substances are reacted in the same general manner as described in Example 1 and a polyester having an acid number of about 6–7 is obtained. This polyester is suitable for the applications described in Examples 2 and 3, as well as in other applications, and has good flexibility characteristics.

Example 5

| | Parts |
|---|---|
| Maleic anhydride | 196 |
| Ethylene glycol | 67 |
| Decamethylene glycol | 35 |
| Allyl alcohol | 101 |
| Linseed oil fatty acids | 20 |
| Paratoluene sulfonic acid | 2 |
| Toluene | 211 |

This composition is reacted in the same general manner as described in Example 1 and a polyester is obtained which has good flexibility characteristics after being cured.

Example 6

| | Parts |
|---|---|
| Undecylenic acid | 92 |
| Maleic anhydride | 196 |
| Ethylene glycol | 98 |
| Allyl alcohol | 96 |
| Toluene | 241 |
| Paratoluene sulfonic acid | 2–3 |

The general procedure of Example 1 is followed in reacting these substances to produce a polyester having an acid number of about 20. Films of this polyester upon curing are somewhat softer than those obtained from the other compositions described above, but are superior to those compositions in flexibility and in adhesive characteristics.

Example 7

| | Parts |
|---|---|
| Fumaric acid | 464 |
| Ethylene glycol | 135 |
| Allyl alcohol | 255 |
| Linseed oil fatty acids | 43 |
| Paratoluene sulfonic acid | 4 |
| Ethylene dichloride | 449 |

These substances are reacted in accordance with the general procedure described in Example 1 and a polyester having very similar characteristics is obtained.

Example 8

| | Parts |
|---|---|
| Diallyl maleate | 1,470 |
| Maleic anhydride | 490 |
| Ethylene glycol | 326 |
| p-Toluene sulfonic acid | 10 |
| Toluene | 1,148 |

This composition is reacted in the same general manner as described in Example 1. A polyester having an acid number of about 15–16 is obtained and may be used for laminating cloth in the same general manner as paper is laminated according to the procedure of Example 2. The laminated cloth produced from this resin has very high impact strength and is suitable for the production of gears.

Among the dicarboxylic acids which may be used in the preparation of my polyesters, the $\alpha,\beta$-unsaturated organic acids are preferred. Examples of these are maleic, fumaric, itaconic, citraconic, mesaconic and aconitic acids, and halogenated acids such as chloromaleic acid, etc. Other dicarboxylic acids which may be used include phthalic, sebacic, adipic, azeleic, terephthalic, pimelic, brassylic, etc. Any of the foregoing may be substituted in part with acrylic acid, $\beta$-benzoyl acrylic acid, methacrylic acid, $\Delta^1$-cyclohexene carboxylic acid, cinnamic acid, crotonic acid, undecylenic acid, and other monocarboxylic acids. Obviously various mixtures of the dicarboxylic acids may be used where expedient and these mixtures may in addition be admixed with some monocarboxylic acid.

The term "acid" as used herein is intended to cover the acid anhydride, as well as the acid itself since either or both may be used according to availability and convenience.

Of the polyhydric alcohols which may be used in carrying out my invention, the glycols are preferred. Among these the following are included: ethylene glycol, α-propylene glycol, polyethylene glycols (e. g., diethylene glycol, triethylene glycol, tetraethylene glycol, pentaethylene glycol, hexaethylene glycol, etc.) polymethylene glycols (e. g., trimethylene glycol, decamethylene glycol, etc.) octadecandiol, 2,2-dimethyl propanediol-1,3; 1,3 butanediol; 1,2 propanediol; and 2-ethyl 2-butyl butanediol-1,3. Glycerol or glycerol monoethers may also be used if desirable, as well as other polyhydric alcohols such as trimethylolpropane, nitroglycols, etc.

The unsaturated alcohols which are suitable for the purposes of my invention are the esterifiable primary and secondary alcohols which have a terminal double bond and which are straight chain hydrocarbon derivatives. Examples of these are allyl alcohol, methyl vinyl carbinol, allyl carbinol ($CH_2=CH-CH_2-CH_2OH$), $\beta$-allyl ethyl alcohol ($CH_2-CH-(CH_2)_3OH$). Esters of these alcohols may also be used, e. g., diallyl phthalate, diallyl maleate, diallyl fumarate, etc.

Various modifiers which have previously been used in alkyd resins may also be incorporated. Among these are the ordinary monobasic acids and the monohydric alcohols. The addition of these alcohols or acids may serve to impart certain properties to the resinous materials to a sufficient degree which they would not otherwise have, such as plasticity, flexibility, hardness, solubility, rapid air-drying properties, etc. Among the most useful of these modifiers are the fatty acids or their esters and especially the drying oil fatty acids or the drying oils themselves. Among the drying oils (or the acids therefrom and the esters thereof) which may be used, linseed oil, perilla oil, oiticica oil, sunflower seed oil, tung oil, etc., are included. Other fatty oils or the acids derived therefrom and the esters thereof which may be used are: olein, oleic acid, stearin, stearic acid, castor oil, soya bean oil, olive oil, etc. Various mixtures of the fatty oils or fatty oil acids may be used, as well as individual fatty acids derived from the fatty oils.

Esterification of my resinous materials is preferably effected by heating under azeotropic conditions in the presence of a suitable organic solvent (usually inert) which is preferably substantially insoluble in water but which dissolves the reactants, as well as the resulting polyester resin. Examples of these are: benzene, toluene, xylene, chloroform, carbon tetrachloride, ethylene dichloride, propylene dichloride, ethylene and propylene trichlorides, butylene dichlorides and trichlorides, cresols, cyclohexanone, methyl cyclohexone, etc. The range of preferred concentration for the inert organic solvent is from about 25% to about 50% of the total weight of the reactants and organic solvent. It is also possible but not generally desirable to use a large excess of the unsaturated monohydric alcohol which is to be used as a reactant, e. g., allyl alcohol in place of or in addition to the inert organic solvent. It is to be noted, however, that when an excess of allyl alcohol be used, a relatively large proportion of the diallyl ester will be produced.

It is preferable that a suitable esterification catalyst be employed, examples of which are p-toluene sulfonic acid, thymol sulfonic acid, d-camphor sulfonic acid, stannic chloride, stannic chloride dioxanate, etc. Only a small proportion of catalyst is generally sufficient, e. g., about 1%–3% of the weight of acid reacted.

The esterification reaction is preferably carried out in a suitable reaction chamber which is provided with an agitator, a reflux condenser and preferably a trap for separating and removing the water formed during the esterification, together with means for returning the essentially non-aqueous fraction of the distillate to the reaction chamber after condensation. It is also advantageous to carry out the reaction under an inert atmosphere such as nitrogen or carbon dioxide. The reaction temperature is preferably controlled so that no local overheating will occur. The reaction temperature will depend upon the inert organic solvent employed if any be used, and upon the concentration of said solvent, as well as the concentration of the reactants. Generally the reaction temperature should range between about 90°–200° C.

The esterification reaction is continued until the acid number of the polyester resin being formed is sufficiently low. The inert solvent and/or excess unsaturated alcohol are removed by distillation and the ester of the unsaturated alcohol (which is formed along with the polyester resin) is distilled off under vacuum, e. g., at about 1–10 mm. mercury absolute pressure. The residue comprises the polyester resin product.

Polymerization catalysts may be incorporated in my resinous materials, the organic peroxides being particularly suitable for this purpose. Among the preferred catalysts there are: the acidic peroxides, e. g., benzoyl peroxide, phthalic peroxide, succinic peroxide and benzoyl acetic peroxide; fatty oil acid peroxides, e. g., lauroyl or cocoanut oil acid peroxides and oleic peroxide; alcohol peroxides, e. g., tertiary butyl peroxide and terpene oxides, e. g., ascaridole. Still other polymerization catalysts may be used in some instances such as soluble cobalt salts (particularly the linoleate and naphthenate), p-toluene sulfonic acid, aluminum chloride, stannic chloride and boron trifluoride. In many instances it may be desirable to use a mixture of these catalysts, e. g., the combination of benzoyl peroxide with a cobalt salt.

The concentration of polymerization catalyst employed is usually small, i. e., for the preferred catalysts, from about 0.1% to about 2% of the polyester. If a polymerization inhibitor be present, up to 5% or even more of catalyst may be necessary according to the concentration of inhibitor. Where fillers are used which contain high concentrations of substances which act as inhibitors, e. g., wood flour, cork, granules, etc., the concentration of catalyst necessary to effect polymerization may be well above 5%.

My polyester may be mixed with one or more of the various fillers, e. g., wood flour, wood fiber, paper dust, clay, zein, glass wool, mica, granite dust, asbestos, casein, silk flock, cotton flock, steel wool, carborundum, paper, cloth, sand, white, black or colored pigments, etc. Furthermore, suitable dyes may also be used for coloring purposes if desirable. Compatible natural and synthetic resins may also be admixed with my new resinous materials, e. g., shellac, cellulose esters and ethers, urea-aldehyde resins, triazine-aldehyde resins such as melamine-formaldehyde resin, phenol-aldehyde resins, alkyd resins, ester gum, rubber, synthetic rubber-like products, rubber compounds, etc.

In some instances it may be desirable to include a polymerization inhibitor in my polyester resinous compositions in order to improve the stability during storage or to control the reaction velocity during polymerization. Phenolic compounds, especially the polyhydric phenols and the aromatic amines act as polymerization inhibitors. Specific examples of this group of inhibitors are hydroquinone, resorcinol, tannin, sym. di-beta-naphthyl-p-phenylene diamine

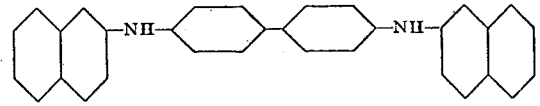

and phenolic resins. Sulfur compounds, benzaldehyde and 1-ascorbic acid are also suitable.

The concentration of the inhibitor is preferably low and usually less than 1% is sufficient. With the preferred inhibitors only about 0.01% to about 0.1% is sufficient.

Resinous materials made according to my invention have a wide variety of uses as in coating compositions and in molding compositions. My resins are particularly suitable for the production of laminated paper or cloth materials used in the production of electrical insulation, gear wheels, abrasive wheels or disks, brake linings and various other molded objects. Coating compositions containing these resins are valuable for coating metallic receptacles such as beverage and food containers, for treating cloth or paper to render the same resistant to moisture or other chemical action, the resulting products being suitable for shower curtain cloth, tobacco pouches, electrical insulating cloth, etc. Coating compositions containing my resins may also be used in a wide variety of lacquers, varnishes, enamels and paints. My resins are also useful in the production of gaskets and in the manufacture of printing inks.

My polyesters may be polymerized at room temperature, although it is generally desirable to utilize elevated temperatures. Generally if the compositions contain catalysts, temperatures between about 100° C. and about 165° C. are suitable. It may be desirable to partially cure my polyesters in some applications at somewhat lower temperatures, e. g., 50°–80° C. but in order to effect the final cure more rapidly temperatures between about 135°–165° C. are desirable. The optimum range of polymerization temperatures obviously will vary for each polyester, as well as with the type of application, i. e., molding, casting, laminating, surface coating, etc. Polymerization or curing of my polyesters in an inert atmosphere has been found to be advantageous in some instances.

The rate of polymerization of my polyesters is accelerated when they are subjected to ultra-violet light, infra-red and other light radiations. They may be heated simultaneously with the light radiation to further increase the rate of polymerization.

Obviously many modifications and variations in the processes and compositions described herein may be made without departing from the spirit and scope of the invention as defined in the appended claim.

I claim:

A process which comprises polymerizing by heating in the presence of benzoyl peroxide a resin obtained by the esterification of maleic acid and linseed oil fatty acids simultaneously with ethylene glycol and allyl alcohol, the molal ratio of the maleic acid, linseed oil fatty acids, ethylene glycol and allyl alcohol being about 4:0.13:2.1:4.4 respectively, said esterification being effected by heating the reactants in admixture with an inorganic solvent and azeotropically distilling a mixture including allyl alcohol, water and the inorganic solvent, and separating the water from the distillate and returning the non-aqueous fraction of the condensate to the reaction chamber, the esterification being continued until the acid number is about 6–7 and distilling off volatile material at about 140–150° C. at about 1–5 mm. of mercury absolute pressure, said heating being continued until a hard resinous material is obtained.

DONALD G. PATTERSON.

CERTIFICATE OF CORRECTION.

Patent No. 2,280,256. April 21, 1942.

DONALD G. PATTERSON.

It is hereby certified that error appears in the printed specification of the above numbered patent requiring correction as follows: Page 2, second column, line 28, for "$(CH_2-CH-(CH_2)_3OH)$" read --$(CH_2=CH-(CH_2)_3OH)$--; and that the said Letters Patent should be read with this correction therein that the same may conform to the record of the case in the Patent Office.

Signed and sealed this 9th day of June, A. D. 1942.

(Seal)

Henry Van Arsdale,
Acting Commissioner of Patents.